United States Patent [19]

Wulfing et al.

[11] Patent Number: 4,515,330
[45] Date of Patent: May 7, 1985

[54] TAPE ROLLER FOR A TAPE CASSETTE

[75] Inventors: James J. Wulfing, Afton; Robert M. Rood, Woodbury, both of Minn.

[73] Assignee: Minnesota Mining and Manufacturing Company, St. Paul, Minn.

[21] Appl. No.: 542,416

[22] Filed: Oct. 17, 1983

[51] Int. Cl.³ .................. G03B 1/04; G11B 15/32; B65H 17/22
[52] U.S. Cl. .................... 242/197; 242/199; 226/189
[58] Field of Search .......... 242/55.19 A, 76, 197–200; 226/189, 190, 194; 360/132, 137

[56] References Cited

U.S. PATENT DOCUMENTS

| | | | |
|---|---|---|---|
| 3,054,546 | 9/1962 | Filipowicz | 226/194 |
| 3,601,335 | 8/1971 | Dopkins et al. | 242/199 |
| 3,642,229 | 2/1972 | Downey et al. | 242/199 |
| 3,829,040 | 8/1974 | Nelson | 242/199 |

FOREIGN PATENT DOCUMENTS 2551736  5/1976  Fed. Rep. of Germany ...... 242/199

Primary Examiner—Leonard D. Christian
Attorney, Agent, or Firm—Donald M. Sell; James A. Smith; David W. Anderson

[57] ABSTRACT

A tape roller has a plastic sleeve which is journalled between bearings formed in opposing walls of a plastic cassette housing. The wall is cored out around at least one of those bearings so that the bearing is supported only by bridges which bow outwardly to receive an oversize sleeve. Preferably there are two such bridges at the bearing, the thicknesses of which are about 20% that of the wall.

7 Claims, 4 Drawing Figures

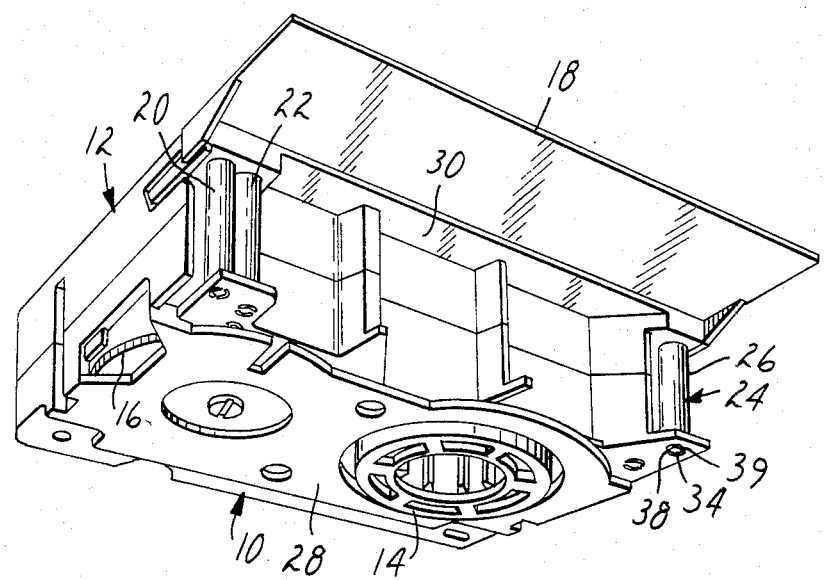
FIG. 1
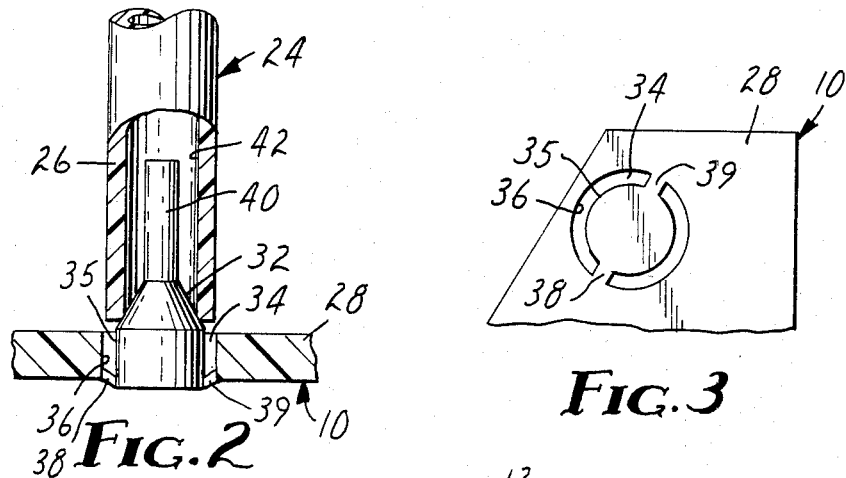
FIG. 2
FIG. 3
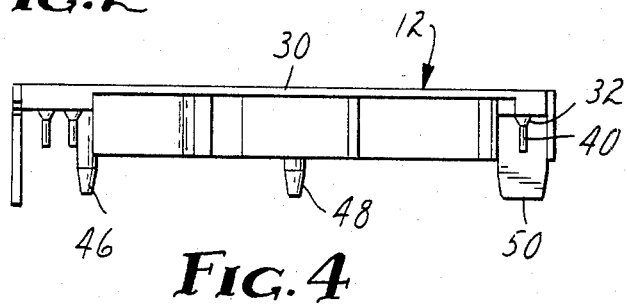
FIG. 4

TAPE ROLLER FOR A TAPE CASSETTE

FIELD OF THE INVENTION

The invention concerns a tape roller journalled between the front and back walls of a tape cassette.

BACKGROUND ART

Each of the VHS and Betamax videotape cassettes has one tape roller and three steel guide posts. Current standards for these cassettes require the tape roller to consist of a fixed steel pin and a rotatable plastic sleeve. Because of clearance between the ends of the sleeve and the cassette walls, the sleeve may strike the walls repeatedly to produce a chatter which is audibly objectionable to some users. Audible noise also is generated due to the clearance between the steel pin and its sleeve. The fixed steel posts scratch the tape, create a substantial frictional drag on the tape, and if they were replaced by rollers, much less torque would be required to drive the tape.

In order to reduce driving torque, the VHS-C (compact) videotape cassette has no posts and instead has five tape rollers, each consisting of a steel pin and a plastic sleeve. The cummulative chatter of these five tape rollers has been annoying to many users. If assembly of the compact VHS-C cassette were to be automated, it would be desirable to insert the five steel pins simultaneously, but this would be impossible since each pin should fit into zero-clearance openings in the cassette walls.

Many audiotape cassettes have no tape rollers and instead employ plastic posts which are projections from the cassette walls. Friction between the tape and posts produces debris which can contaminate the surfaces of the recording head and tape. In more expensive, higher quality cassettes, the posts are replaced by tape rollers similar to those of the VHS cassettes, with similar noise and assembly problems.

DISCLOSURE OF INVENTION

The present invention concerns a cassette having a tape roller which is of economical construction, lends itself to automated assembly, and requires less parts than do the above-discussed tape rollers. Also, audible chatter is minimized, and frictional drag is small and uniform. Briefly, the novel tape cassette comprises a housing having two broad, parallel walls, each formed with a bearing between which a sleeve is journalled. At least one of those walls is cored out around its bearing, leaving that bearing supported by a plurality of bridges. The length of the sleeve is slightly greater than the normal spacing between the bearings so that the bridges are bowed outwardly by the sleeve.

The housing may be molded of plastic as base and cover parts, each providing one of the broad, parallel walls, and each bearing may be molded integrally with its wall. The sleeve also may be molded plastic to minimize its expense and weight and hence the torque required to rotate the sleeve.

For convenience, each bearing is male and each end of the sleeve is female. Preferably the male bearing is conical. A pin may project from the apex of a male bearing and fit loosely into an axial bore in the sleeve. With that pin positioned upwardly, the sleeve may be dropped onto the pin, thus simplifying automated assembly. If a pin also projects from the apex of the male bearing at the other end of the sleeve, this helps to guide the two housing parts together during assembly.

In a preferred embodiment of the invention, the coring out around each bearing forms a circular channel, which is interrupted by two narrow bridges that are aligned and 180° apart around the circular channel. Preferably the thickness of each bridge is less than half the wall thickness and ideally is about 20% of the wall thickness, thus minimizing the stress when an oversize sleeve bows out the bearing at the bridges. Since the cassette housing should be molded of a tough, impact-resistant plastic such as polycarbonate or ABS (acrylonitrile-butadiene-styrene copolymer), a bridge of only 20% of the wall thickness should have adequate resistance to breakage, even if the cassette were dropped onto concrete.

The sleeve should be selected to provide a low coefficient of friction in contact with the material of the housing. With a polycarbonate housing, an acetal sleeve provides an excellent interface.

By making the sleeves slightly oversize, the bridges are constantly bowed out in an assembled cassette. While plastic flow may gradually reduce the stress on those bridges over a long period of time, that stress should not drop to zero. Even if plastic flow were to reduce the stress nearly to zero, there should be no chattering. If the stress exerted by the bowed-out bridges were to be reduced to zero, this would be accompanied by a corresponding, desirable reduction in frictional drag.

Each tape roller of the invention has only one separate part, the sleeve, as compared to two parts in each standard VHS, VHS-C and Betamax roller, thus simplifying both inventories and assembly apparatus.

Assembly of the housing is enhanced if either the base or the cover has three or more tapered projections which fit loosely upon beginning to enter mating openings in the other part, then fit more snugly as the base and cover are pressed together. Preferably the fit of at least one of those tapered projections become tight, thus releasably locking the cover to the base. Subsequent disassembly is enhanced if there are two such projections at one edge wall of the housing which move into a locking friction fit and a third projection at the opposite edge wall at which there is a loose, but close to zero, clearance.

THE DRAWING

In the drawing

FIG. 1 schematically illustrates in perspective a VHS-C tape cassette having tape rollers of the invention, three of which are shown;

FIG. 2 is an enlarged fragmentary cross-section through one of the tape rollers of FIG. 1;

FIG. 3 shows a fragment of the outer face of the wall at which the tape roller of FIG. 2 is journalled; and FIG. 4 is a schematic edge view of the cover of the cassette of FIGS. 1-3.

The housing of the tape cassette of FIGS. 1-4, comprises a base 10, a cover 12, and two tape spools 14 and 16. A length of magnetic recording tape (not shown) extends between the spools 14, 16 across the front side of the housing which can be closed by a visor-type door 18. At that front side, one can see three tape rollers 20, 22 and 24, each of which has the same construction. As can be seen in FIGS. 2 and 3, the tape roller 24 consists of a plastic sleeve 26 which is journalled between bearings that are integrally molded with the broad wall 28 of the base 10 and the broad wall 30 of the cover 12. The wall 28 is formed with a conical male bearing 32 and is cored out around the bearing to form a circular channel 34. The edges 35 and 36 of the wall 28 at the channel 34 form coaxial circles which are interrupted by two narrow bridges 38 and 39 that are aligned and 180° apart around those circles. The width of each bridge is about 10% of the circumferences of those circles. The bridges are slightly bowed outwardly by the sleeve 26, the bowing being exaggerated in FIG. 2.

As can be seen in FIG. 2, the thickness of each of the bridges 38, 39 is about 20% of the thickness of the wall 28, and the length of each bridge is less than the radius of the circle formed by the inner edge 35. Projecting from the apex of the bearing 32 is a pin 40 which fits loosely into a bore 42 in the sleeve 26.

Referring to FIG. 4, two tapered projections 46, 48 of circular cross section and one tapered projection 50 of elongate cross section are integrally molded with the cover 12 and fit into openings (not shown) in the base 10. Each of the projections is tapered to fit loosely when first entering its opening, but the base of each of the projections 46 and 50 fits snugly into its opening. On the other hand, the base of the projection 48 fits loosely into its opening to enhance disassembly.

To assemble the cassette with the pin 40 and the four other pins of the base 10 projecting upwardly, the relatively large bore 42 in the sleeve 26 easily fits over the pin 40, and each pin of the cover easily fits into its sleeve. By virtue of this guiding, the illustrated cassette lends itself to automated assembly.

EXAMPLE

A VHS-C cassette as shown in FIGS. 1-4 was made by molding each of the base 10 and cover 12 of polycarbonate and the sleeve 26 of acetal resin ("Valox" 325) which is currently widely used for the sleeves of tape rollers of the prior art because of its good lubricity and dimentional stability. Its lubricity in contact with polycarbonate is exceptionally good. Each tape roller of the VHS-C cassette had the following dimensions:

Bridges 38, 39
   length: 0.64 mm
   width: 0.74 mm
   thickness: 0.36 mm
Wall 28 thickness: 1.22 mm
Cone angle of bearing 32: 30°
Pin 40
   length: 6.3 mm
   diameter: 1.2 mm
Bore 42 diameter: 2.1 mm
Spacing between walls 28, 30: 17.5 mm
Sleeve 26
   length: 15.0 mm
   diameter: 5.0 mm

What is claimed is:

1. Tape roller for a tape cassette defined by a housing having two broad parallel walls, said roller comprising:
   two coaxial bearings extending toward each other from said housing walls, said bearings each including a taper which narrows with increasing distance from its respective wall;
   at least one of said housing walls including a transverse wall surrounding its associated bearing to define a housing wall hole having dimensions which afford a clearance between said transverse wall and said associated bearing;
   a plurality of resilient bridge members connecting said transverse wall defining said hole and said associated bearing, said bridge members permitting resilient movement of said associated bearing in a direction perpendicular to the planes of said housing walls while restricting movement of said associated bearing parallel to the planes of said housing walls;
   a sleeve including tubular ends each having an inner diameter sized to contact each of said bearing tapers, said sleeve having a length sufficient to cause said resilient movement of said associated bearing when said housing walls are assembled to define said tape cassette;
   said resilient movement of said associated bearing creating a force which maintains said tapers in contact with said sleeve.

2. Tape roller according to claim 1 further including a housing wall hole and bridge members associated with both of said bearings to afford said resilient movement of each of said bearings.

3. Tape roller according to claim 1 further including a pin projecting from the end of at least one of said bearings toward the other bearing, said pin fitting loosely within one of said tubular walls of said sleeve to support said sleeve prior to assembly of said housing walls.

4. Tape roller according to claim 1 wherein said transverse wall is circular to define a circular hole and said bridge members are two in number and diametrically opposed with respect to said hole.

5. Tape roller as defined in claim 4 wherein the thickness of each bridge member is less than half the thickness of said housing wall.

6. Tape roller as defined in claim 5 wherein the width of each bridge member is about 10 percent of the circumference of said circular hole.

7. Tape roller as defined in claim 6 wherein the thickness of each bridge member is about 20 percent of the thickness of said housing wall.

* * * * *